United States Patent [19]

Gibson et al.

[11] Patent Number: 4,997,313

[45] Date of Patent: Mar. 5, 1991

[54] PROCESS FOR IN-SITU SURFACTANT WASHING OF CONTAMINATED SOIL

[75] Inventors: Thomas L. Gibson, Utica; Abdul S. Abdul, Troy; Carolina C. Ang, Bloomfield Hills; Alva E. Fincham, Farmington Hills, all of Mich.

[73] Assignee: General Motors Corporation, Detroit, Mich.

[21] Appl. No.: 522,705

[22] Filed: May 14, 1990

[51] Int. Cl.$^5$ ............................................. E02D 3/00
[52] U.S. Cl. .................................... 405/128; 166/261
[58] Field of Search ...................... 405/128, 129, 258; 166/261; 210/610, 611; 435/264

[56] References Cited

U.S. PATENT DOCUMENTS

| 4,611,950 | 9/1986 | Russomano | 405/128 |
| 4,687,373 | 8/1987 | Falk et al. | 405/128 |
| 4,765,902 | 8/1988 | Ely et al. | 405/128 X |
| 4,849,360 | 7/1989 | Norris et al. | 405/128 X |
| 4,850,745 | 7/1989 | Hater et al. | 405/128 X |

Primary Examiner—Dennis L. Taylor
Attorney, Agent, or Firm—George A. Grove

[57] ABSTRACT

A method is disclosed for the use of an aqueous surfactant solution to remove water-insoluble, organic contaminant from subsurface soil layers. The process is carried out continuously with the application of the surfactant solution and the removal of the leachate from a recovery well within the treatment area. It is contemplated that the leachate will be treated above ground to remove the dispersed contaminant.

3 Claims, 1 Drawing Sheet

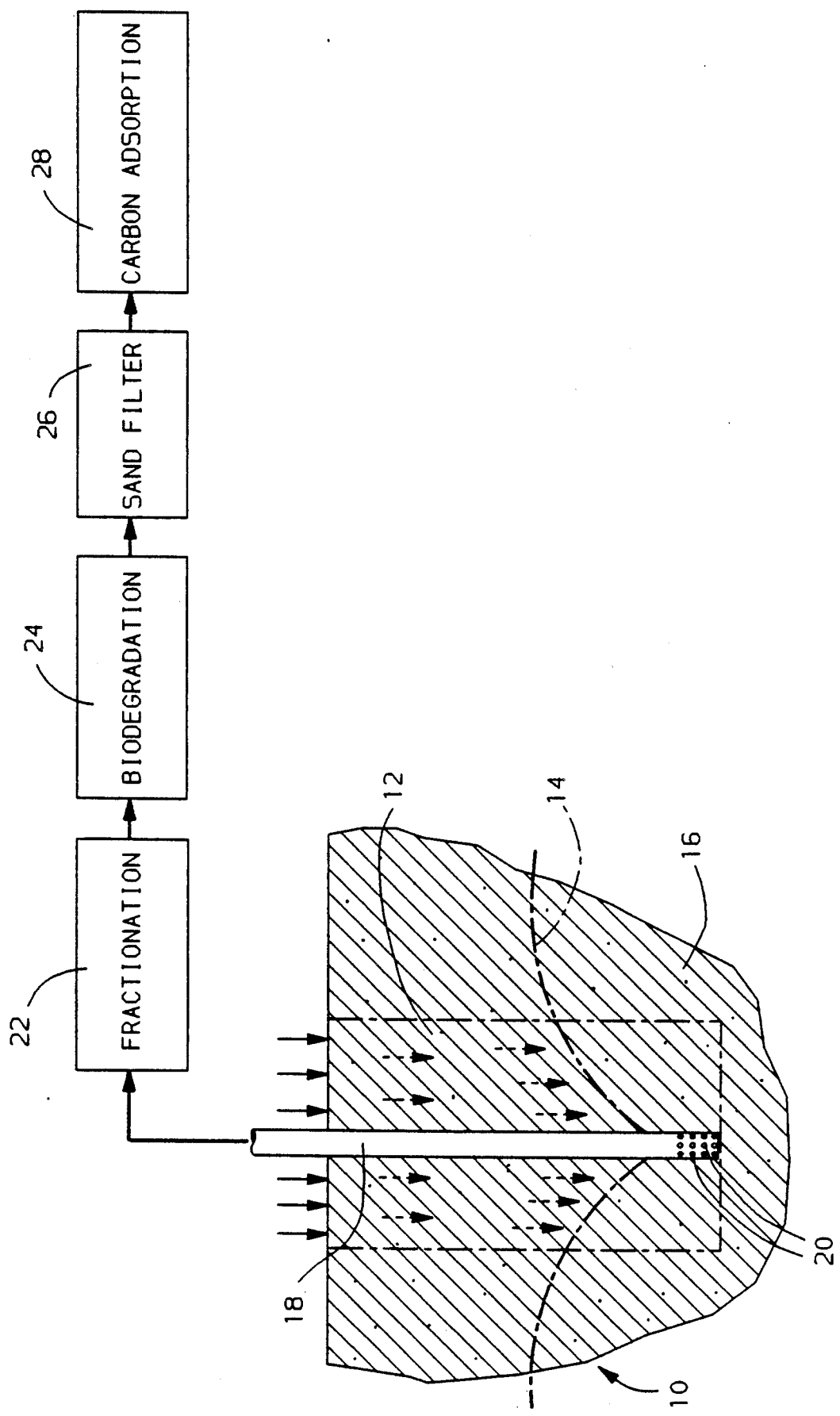

PROCESS FOR IN-SITU SURFACTANT WASHING OF CONTAMINATED SOIL

This invention pertains to practices for the removal of water-immiscible organic chemical contaminants from subsurface soil layers. More specifically, this invention relates to the practice of leaching or washing such organic chemicals from subsurface soil formations with a suitable aqueous surfactant solution and subsequently pumping the leachate solution from the underground layer to a surface treatment processing system.

The contamination of soil and ground water systems occurs at some industrial sites. This contamination can occur, for example, because organic chemicals such as mineral oils, polychlorinated biphenyls and the like are stored in underground holding tanks. Sometimes the tanks leak due to corrosion or other damage, or the organic chemical is spilled on the ground leading to the contamination of the subsurface layers of the soil. Sometimes a part of the material can be drained to a trench or a well and pumped out of the layer. Nevertheless, even in ideal circumstances, residual organic chemical contaminant remains adhering to soil particles.

Where such contamination persists, it has often been necessary to excavate the site, removing the soil and transporting it someplace for removal of, or treatment of, contaminated material. This process is very expensive. Moreover, it is not suitable for saturated zones below the water table, it is not suitable for production areas of industrial plants, and it alters or disrupts the original site.

Obviously, it would be desirable to have a method of removing hydrophobic organic contaminants from subsurface soil layers without having to disrupt the site. It is an object of this invention to provide a method of washing or leaching the contaminant from the subsurface soil particles with an aqueous surfactant solution. The rate of application of the surfactant solution is controlled to minimize lateral spread of the solution. The contaminant-containing solution that forms is called a leachate, and it is to be captured at the water table in the soil formation. Leachate is recovered at a rate that minimizes removal of ground water.

It is a further object of this invention to carry out such washing or leaching operation on a continuous basis over a prolonged period of time until the contaminant is slowly but satisfactorily removed from the soil particles. It is still another object of this invention to provide a practice by which the leachate is systematically pumped from below the ground level to an external processing system where the contaminant is removed or destroyed. The surfactant is removed and clean water is provided.

BRIEF SUMMARY OF THE INVENTION

In accordance with a preferred embodiment of our invention, these and other objects and advantages are accomplished as follows. The contaminated area is surveyed by the taking of soil core samples to determine the area of the contaminated site and the depths to which the chemical organic contaminant has reached. One or more monitoring wells are installed to determine the location of the water table.

Soil samples are also employed to determine the hydraulic flow characteristics of the soil. In addition, soil-contaminant samples are used in the important selection of a surfactant and an aqueous surfactant concentration for purposes of the washing operation of our process. Soil-contaminant samples may be packed into a cylindrical glass column for a laboratory testing and selection of the surfactant.

Surfactants are evaluated based on their solubility in oil and water, their detergency, their ability to disperse oil from soil particles and to emulsify the oil in the aqueous solution and carry it through and from the soil formation. The foaming characteristics of the surfactant are also important, together with their ability to wet oil-coated soil particles. Preferred surfactants are also susceptible to biodegradation or other treatment for the removal of the surfactant from the soil after the contaminants are washed out and from the leachate solution.

The contaminated site may then be suitably divided into treatment areas. The surfactant solution is sprinkled over or otherwise applied to the ground at the surface area and allowed to permeate downward into the porous strata to wash the soil particles and leach off the contaminant material as it flows. Preferably the surfactant solution is applied at a rate at which its flow downward through the soil formation can be accommodated without excessive lateral flow.

We locate leachate recovery wells and/or tile drains at strategic locations within the site being washed. For example, if the site is generally circular in configuration, we can locate the recovery well at the center of the site. The bottom of the well is located below the region being treated. Water and leachate solution is pumped from this extraction or recovery well at a rate that creates a low hydraulic pressure region around the well, thereby inducing flow of the contaminant-laden leachate solution to the well. In the event that the soil is contaminated to a depth of 6 to 10 feet, for example, the recovery well may extend the depth of 13 to 15 feet into the ground. Mathematical modeling may be used to select the initial rate of surfactant application and leachate recovery.

In accordance with the preferred embodiment of our invention, we also monitor hydraulic pressure and flow within and at the periphery of the region that is being treated so as to assure that the application rate of surfactant solution and the removal rate of leachate are suitably balanced so as to minimize lateral flow into or out of the treatment region.

Leachate pumped from the ground through the recovery well is stored in above-ground tanks for treatment. The nature of the treatment, of course, depends upon the composition of the contaminant and the surfactant. In general, some of the hydrophobic contaminant may simply be allowed to separate from the aqueous layer and be recycled or disposed of as appropriate. The residual aqueous leachate may be treated with suitable bacteria, or the like, to break down entrained chemical organic materials and surfactant. This process is carried out until these unwanted materials have been decomposed for removal from the water. Bacteria is allowed to settle to the bottom of the liquid and separation is made. The water is then filtered and/or treated by absorption processes, if necessary, to remove any trace residual contamination.

Other objects and advantages of our invention will become more clear from a detailed description thereof which follows.

BRIEF DESCRIPTION OF THE DRAWING

The FIGURE of the drawing is a schematic representation of our practice of washing a contaminated subsurface soil plot with a surfactant, removing the leachate from the plot and pumping it to an above-ground treatment system.

DETAILED DESCRIPTION OF A SPECIFIC EMBODIMENT

We have used this surfactant washing process to remove polychlorinated biphenyls (PCBs) from a soil region into which these materials had leaked. The specific PCB was Aroclor 1248. Soil sampling indicated that the contaminated site was about seven acres in area. We selected a small portion of the area, about 10 feet in diameter, for testing of our method. The test plot extended to a depth of about five feet.

Soil samples were prepared containing known quantities of Aroclor 1248, and these samples were packed in cylindrical glass columns for the purpose of selecting a suitable surfactant. In general, we prefer the use of nonionic or anionic surfactants because they do not chemically interact with clay minerals in the soil. We evaluated a number of different chemical types of surfactants including ethoxylated alcohols (nonionic), ethoxylated nonylphenols (nonionic), sulfates (anionic) and sulfonates (anionic). We selected an ethoxylated alcohol surfactant supplied by the Witco Company under the trade designation Witconol SN70. This surfactant is fully miscible with water at 25° C. and forms an essentially neutral water solution. It is neither toxic nor hazardous and can be biodegraded by soil microbes. Relatively dilute solutions of this surfactant are found to effectively remove the Aroclor 1248 from soil particles carrying the material in the micelles of the surfactant solution. While this specific surfactant was found to be very effective in removing the Aroclor 1248 from the soil particles, the surfactant had a minimal effect on colloidal soil particles themselves. We view this as preferred so that the colloidal size soil grains are not dispersed or solubilized so as to plug the soil formation.

The aqueous surfactant solution at a concentration of about one percent by weight of the Witconol SN70 is applied at a rate of about 77 gallons per day over the ten-foot diameter area being washed. A four inch diameter recovery well is installed through the middle of the test plot to a depth of about 13 feet. The bottom portion of the well is slotted so that leachate and ground water can flow into the well. Three small monitoring wells are installed at the circumference of the ten foot diameter area being washed. We also employ manometer pressure sensors and neutron probe moisture measuring devices at selected areas in the soil formation to a depth of about six feet to sense the flow of water in the formation as we apply our surfactant solution to the treatment area and removed leachate and ground water from it.

Our soil samples showed that the water table was at a level of about four feet below ground level. We pump from our extraction well at a rate so as to reduce the water level in the region of the well to induce the flow of leachate from the above formation into the well. We try to minimize the flow of ground water through the recovery pipe. We find that the leachate flow down through the test formation creates a water saturation of about 69 to 90 percent in the region above the water table. We pump the leachate out of the formation at a rate of about 157 gallons per day.

Referring to the drawing FIGURE, the downward-pointing arrows depict the application of the aqueous surfactant solution to the surface of a contaminated site indicated generally at 10. The solution permeates down through contaminated soil layer 12 above water table 14. The solution contacts contaminated soil particles, washing them and collecting the contaminant in surfactant micelles suspended in the aqueous vehicle. A leachate is thus formed. Recovery well 18 extends down through layer 12 below water table 14 into the ground water saturated soil layer 16. Ground water and leachate are pumped by suitable means (not shown) through slots 20 in the lower end of recovery well 18 depressing the water table 14 in the region around the well 18. The aqueous leachate is thus pumped up through recovery well 18 to a suitable remote above-ground treatment system.

The recovered leachate is first pumped into a fractionation tank 22 large enough to hold several days of recovered material. This tank is plumbed so that floating oily material can be removed from the top of the leachate and the aqueous leachate can be drained from the bottom of the tank. Floating oil is first removed. Then the leachate water with dissolved and suspended surfactant and contaminants is transferred to a bioreactor tank 24 already containing active wastewater treatment bacteria. This reactor is equipped at the bottom with aeration lines plumbed to compressed air. The tank is inoculated previously with bacteria from an industrial wastewater treatment plant. The bioreactor is fed before use with appropriate amounts of a nutrient mixture containing sources of carbon, nitrate and phosphate to promote the growth of a large bacterial population. Leachate is treated in the tanks for about two weeks with the bacteria material and the composition of the leachate is monitored by sampling and chemical analysis. At the end of the two week period, the leachate contains very low levels of surfactant and PCBs, if any.

Agitation of the treated leachate is then stopped to allow the bacteria to settle to the bottom before the liquid is removed from the top. The leachate is then pumped through a sand filter 26 and then through a filter 28 of activated carbon to absorb any remaining trace levels of organic contaminants. The clean liquid is then discharged to a regular waste water treatment system.

We contemplate that the practice of our invention may be carried out over a period of months and even years to fully remove contaminant from underground soil formations. The advantage of our practice is that it is relatively inexpensive and it does not disrupt the terrain. Apart from the use of a few small wells, our treatment process is a noninvasive process that can remove contamination without destroying the terrain.

While our invention has been described in terms of the preferred embodiment thereof, it will be appreciated that other forms could readily be adapted by those skilled in the art. Accordingly, the scope of our invention is intended to be limited only by the following claims.

The embodiments of the invention in which an exclusive property or privilege is claimed are defined as follows:

1. A method of removing hydrophobic, organic contaminants trapped in a porous subsurface soil formation comprising,
    removing soil samples from a selected treatment region of the formation to determine the area, depth and chemical properties of the contamination and the hydraulic flow properties of the soil, formulating an aqueous surfactant solution adapted to disperse and remove such contaminant from soil particles in the formation, applying the surfactant solution to the surface of the treatment region at a rate determined to maintain subsurface flow of the surfactant solution generally within the treatment area, the solution slowly permeating downwardly in the formation to disperse and carry contaminant with it as a leachate, forming one or more recovery wells within the treatment region, removing leachate from such well to the surface at a rate that promotes steady leachate flow to the well bottom, and collecting the leachate above ground for treatment to remove contaminant and surfactant from the leachate.

2. A method of removing hydrophobic, organic contaminants trapped in a porous subsurface soil formation comprising, removing soil samples from a selected treatment region of the formation to determine the area, depth and chemical properties of the contamination and the hydraulic flow properties of the soil, formulating an aqueous surfactant solution adapted to disperse and remove such contaminant from soil particles in the formation, applying the surfactant solution to the surface of the treatment region at a rate determined to maintain subsurface flow of the surfactant solution generally within the treatment area, the solution slowly permeating downwardly in the formation to disperse and carry contaminant with it as a leachate, forming one or more recovery wells within the treatment region, removing leachate from such well to the surface at a rate that promotes steady leachate flow to the well bottom to capture all the leachate while minimizing the removal of ground water, and collecting the leachate above ground for treatment to remove contaminant and surfactant from the leachate.

3. A method of removing hydrophobic, organic contaminants trapped in a porous subsurface soil formation comprising, removing soil samples from a selected treatment region of the formation to determine the area, depth and chemical properties of the contamination and the hydraulic flow properties of the soil, formulating an aqueous surfactant solution adapted to disperse and remove such contaminant from soil particles in the formation, applying the surfactant solution to the surface of the treatment region at a rate determined to maintain subsurface flow of the surfactant solution generally within the treatment area, the solution slowly permeating downwardly in the formation to disperse and carry contaminant with it as a leachate, forming one or more recovery wells within the treatment region, removing leachate from such well to the surface at a rate that promotes steady leachate flow to the well bottom to capture all the leachate while minimizing the removal of ground water, collecting the leachate above ground for treatment to remove contaminant and surfactant from the leachate, and monitoring hydraulic pressure and flow within and at the periphery of the treatment region to assist in balancing the application of the surfactant solution and the removal rate of the leachate so as to minimize lateral spread of the leachate.

* * * * *